United States Patent
Lin et al.

(10) Patent No.: US 8,289,150 B2
(45) Date of Patent: Oct. 16, 2012

(54) WIRELESS SENSOR NETWORK AND DATA SENSING METHOD THEREOF

(75) Inventors: Guan-Rong Lin, Yunlin County (TW); Lun-Chia Kuo, Taichung (TW); Arbee L. P. Chen, Taipei (TW); Yao-Chung Fan, Kaohsiung (TW); En-Tzu Wang, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 439 days.

(21) Appl. No.: 12/430,987

(22) Filed: Apr. 28, 2009

(65) Prior Publication Data

US 2010/0141423 A1    Jun. 10, 2010

(30) Foreign Application Priority Data

Dec. 5, 2008 (TW) .............................. 97147533 A

(51) Int. Cl.
*G08B 1/08* (2006.01)
(52) U.S. Cl. .................... 340/539.1; 340/539.3; 700/67
(58) Field of Classification Search ............... 340/539.1, 340/539.22, 539.26, 539.3, 540; 700/67, 700/73, 9, 14, 20, 55; 455/574, 3.01; 370/318; 714/786, 746; 356/460; 702/177, 178, 188
See application file for complete search history.

(56) References Cited

U.S. PATENT DOCUMENTS

| | | | |
|---|---|---|---|
| 7,793,188 B2 | 9/2010 | Mukhopadhyay et al. | |
| 2003/0144829 A1 | 7/2003 | Geatz et al. | |
| 2007/0080288 A1 | 4/2007 | Lim et al. | |
| 2007/0211654 A1 | 9/2007 | Kim et al. | |
| 2008/0250301 A1* | 10/2008 | Mukhopadhyay et al. | ... 714/786 |
| 2009/0024231 A1* | 1/2009 | Ji et al. | ............... 700/67 |

FOREIGN PATENT DOCUMENTS

| | | |
|---|---|---|
| JP | 07-219623 | 8/1995 |
| JP | 2007-531409 | 11/2007 |
| JP | 2008-059302 | 3/2008 |
| JP | 2008-217055 | 9/2008 |
| JP | 2008-219512 | 9/2008 |
| JP | 2008-234361 | 10/2008 |
| TW | 187188 | 7/1992 |
| TW | 200605365 | 2/2006 |
| TW | 200713114 | 4/2007 |

OTHER PUBLICATIONS

Taiwanese language office action dated Oct. 27, 2011 and its English language translation.

English language translation of JP 07-219623 (published Aug. 18, 1995).

(Continued)

*Primary Examiner* — Brent Swarthout

(74) *Attorney, Agent, or Firm* — Thomas|Kayden

(57) ABSTRACT

A wireless sensor network and data sensing method thereof are provided. A prediction model is established according to sensed data. When statistical value of the sensed data is within a user allowable range, the average value of the sensed data is returned to a user based on the prediction model. Alternatively, when the statistical value of the sensed data is beyond the user allowable range, actually sensed data is returned to the user based on the prediction model. In addition, the prediction model may further be dynamically updated according to subsequently received sensed data.

20 Claims, 7 Drawing Sheets

OTHER PUBLICATIONS

English language translation of JP 2007-531409 (published Nov. 1, 2007).
English language translation of JP 2008-059302 (published Mar. 13, 2008).
English language translation of JP 2008-217055 (published Sep. 18, 2008).
English language translation of abstract of JP 2008-219512 (published Sep. 18, 2008).
Japanese language office action dated May 24, 2012, and its English language translation.
Taiwanese language office action dated May 30, 2012.
English language translation of abstract of TW 200605365 (published Feb. 1, 2006).
Lin, G.R.; "Adaptive Power-Saving Techniques for WSN based on Incremental Data Trend Analysis," Masters Thesis; Jul. 2007.
Japanese language office action dated Feb. 9, 2012.
English language translation of office action, Oct. 19, 2011.
English language translation of JP 2008-234361 (published Oct. 2, 2008).
English Abstract of TW200605365, Feb. 1, 2006.
English Abstract of TW200713114, Apr. 1, 2007.
"PAQ: Time Series Forecasting for Approximate Query Answering in Sensor Networks" Daniela Tulone et al.; In Proc. of the 3rd European Conf. in Wireless Sensor Networks, pp. 21-37, Feb. 2006.
"Online Outlier Detection in Sensor Data Using Non-Parametric Models" S. Subramaniam et al.; VLDB '06; Sep. 2006.
"Online Outlier Detection in Sensor Data Using Non-Parametric Models" S. Subramaniam et al.; VLDB '06; Sep. 2006—PowerPoint presentation.
"Constraint Chaining: On Energy-Efficient Continuous Monitoring in Sensor Networks" Adam Silverstein et al.; SIDMOD 2006; Jun. 2006.
"Constraint Chaining: On Energy-Efficient Continuous Monitoring in Sensor Networks" Adam Silverstein et al.; SIGMOD 2006; Jun. 2006—PowerPoint presentation.

* cited by examiner

WIRELESS SENSOR NETWORK AND DATA SENSING METHOD THEREOF

This application claims the benefit of Taiwan application Serial No. 97147533, filed Dec. 5, 2008, the subject matter of which is incorporated herein by reference.

BACKGROUND

1. Field of the Invention

The invention relates in general to a wireless sensor network, and more particularly to a wireless sensor network for dynamically adjusting detection behavior of sensors according to periodic property of sensed data.

2. Description of the Related Art

A wireless sensor network (WSN) may be applied to such as detection of forest ecology monitor, detection of the concentration of carbon dioxide in the factory, or the indoor monitor. In the wireless sensor network, a wireless sensor for sensing, collecting, and returning data plays an important role.

In the prior art, the wireless sensor detects environment variables and returns data according to a sense frequency (sense interval) specified by an administrator. When the sense interval is longer (sense times are fewer), more energy is saved but less sensed data is obtained. When the sense interval is shorter (the sense times are more), more sensed data may be obtained but the power-consumption could be greater. This is because the power consumption could be relatively great when the wireless sensor is in sensing or transceiving data. In addition, the wireless sensor is usually powered by a battery, and it is hard to charge the battery if in outdoor environment.

Thus, how to save the power consumption of the wireless sensor has become a very important issue. At present, the power-saving mechanism for the wireless sensor is emphasized on the power consumption in transmitting or sensing, but the effect is poor.

In view of this, it needs a data sensing method for analyzing the trend of data collected by the wireless sensor, and for dynamically adjusting the detection behavior (i.e., whether to sense or not) of the wireless sensor according to property of data period).

SUMMARY OF THE INVENTION

The invention is directed to a wireless sensor network and a data sensing method, for establishing a prediction model according to sensed data, wherein the statistical value of the previously sensed data is returned to the user if within the allowable error range and the confidence level. Alternatively, the actually sensed data is returned to the user if necessary.

According to a first example of the present invention, a wireless sensor network is provided. The wireless sensor network includes: a data processing module for outputting a sense command; and a data collection module for receiving the sense command outputted from the data processing module and thus collecting source data and returning to the data processing module. The data processing module finds a trend of the source data to establish a prediction model. The data processing module updates the sense command and sends the updated sense command to the data collection module based on the established prediction model. The data collection module determines whether data collection is performed or not at a sense time point according to the sense command. The data collection module collects the source data and returns to the data processing module if data collection is performed. The data processing module obtains predicted data according to the previous source data if data collection is not performed.

According to a second aspect of the present invention, a data sensing method in a wireless sensor network is provided. The method includes the steps of: outputting a sense command; sensing an source data according to the sense command; finding a trend of the source data to establish a prediction model; updating the sense command based on the established prediction model; determining whether data sensing is performed at a sense time point or not according to the updated sense command; sensing the source data and returning to a user if data sensing is performed; and obtaining predicted data and returning to the user according to the previous source data if data sensing is not performed.

The invention will become apparent from the following detailed description of the preferred but non-limiting embodiments. The following description is made with reference to the accompanying drawings.

BRIEF DESCRIPTION OF THE DRAWINGS

FIG. 5A shows data in time domain, while

DETAILED DESCRIPTION OF THE INVENTION

In embodiment of the invention, data is collected and periodicity of the collected data is calculated. Next, the collected data is stacked together and the trend of the collected data is analyzed based on its periodicity in order to determine that whether to collect (sense) data in the future.

Figure 1:
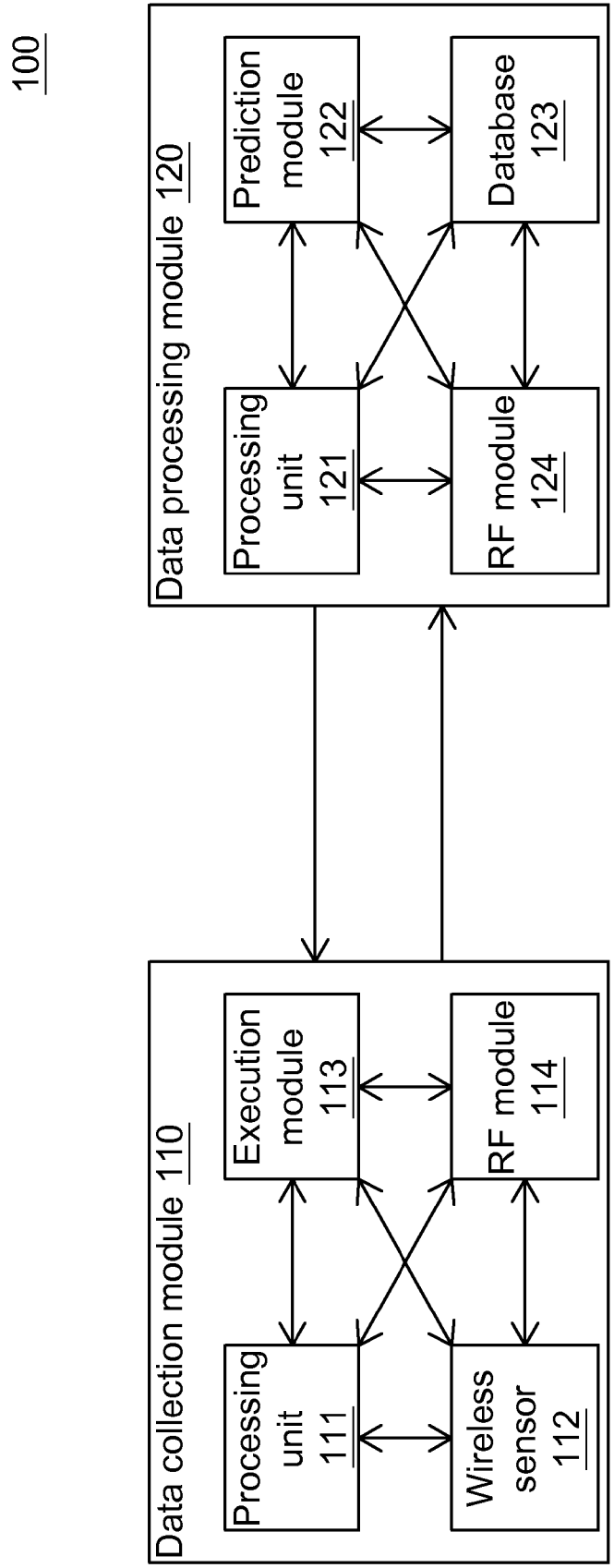
FIG. 1 is a schematic illustration showing a wireless sensor network according to an embodiment of the invention.

FIG. 1 is a schematic illustration showing a wireless sensor network 100 according to an embodiment of the invention. Referring to FIG. 1, the wireless sensor network 100 according to the embodiment of the invention includes a data collection module 110 and a data processing module 120. The data collection module 110 includes a processing unit 111, a wireless sensor 112, an execution module 113 and a radio frequency (RF) module 114. The data processing module 120 includes a processing unit 121, a prediction module 122, a database 123 and a radio frequency (RF) module 124.

The data collection module 110 collects data according to a command transmitted from the data processing module 120 and returns the collected data to the data processing module 120. After the data processing module 120 receives data returned by the data collection module 110, a trend of the collected data is found to establish a prediction model and to dynamically adjust (update) the prediction model.

Based on the established prediction model, the data processing module 120 determines whether or not the data collection module 110 collects data in future. Accordingly, the data collection module 110 performs data collection or not based on the determination of the data processing module 120.

The processing unit 111 performs local computation, such as command analyzing. The processing unit 111 has basic computing ability, may determine the sense period, and may control the wireless sensor 112 to return the sensed result (i.e. the collected data) to the data processing module 120 through the RF module 114.

The wireless sensor 112 is controlled by the processing unit 111 and the execution module 113. The wireless sensor 112 performs data collection, sense, and the like. Data collected by the wireless sensor 112 is transmitted to the data processing module 120 through the RF module 114. The wireless sensor 112 may be a multi-purpose sensor for sensing various environment variables including temperature, humidity, luminance, pressure, gas concentration, and the like.

The execution module 113 analyzes the command transmitted from the data processing module 120 and thus determines whether the wireless sensor 112 performs data collection or not.

The RF module 114 receives and transmits data between the data collection module 110 and the data processing module 120.

The processing unit 121 performs local computing and data analyzing. The prediction module 122 establishes the prediction model according to data collected by the data collection module 110. The database 123 stores data collected by the data collection module 110. The RF module 124 receives and transmits data between the data collection module 110 and the data processing module 120.

The operations of the prediction module 122, about how the prediction model is established according to data collected by the data collection module 110 and how the prediction model is dynamically updated, will be described in the following.

Figure 2:
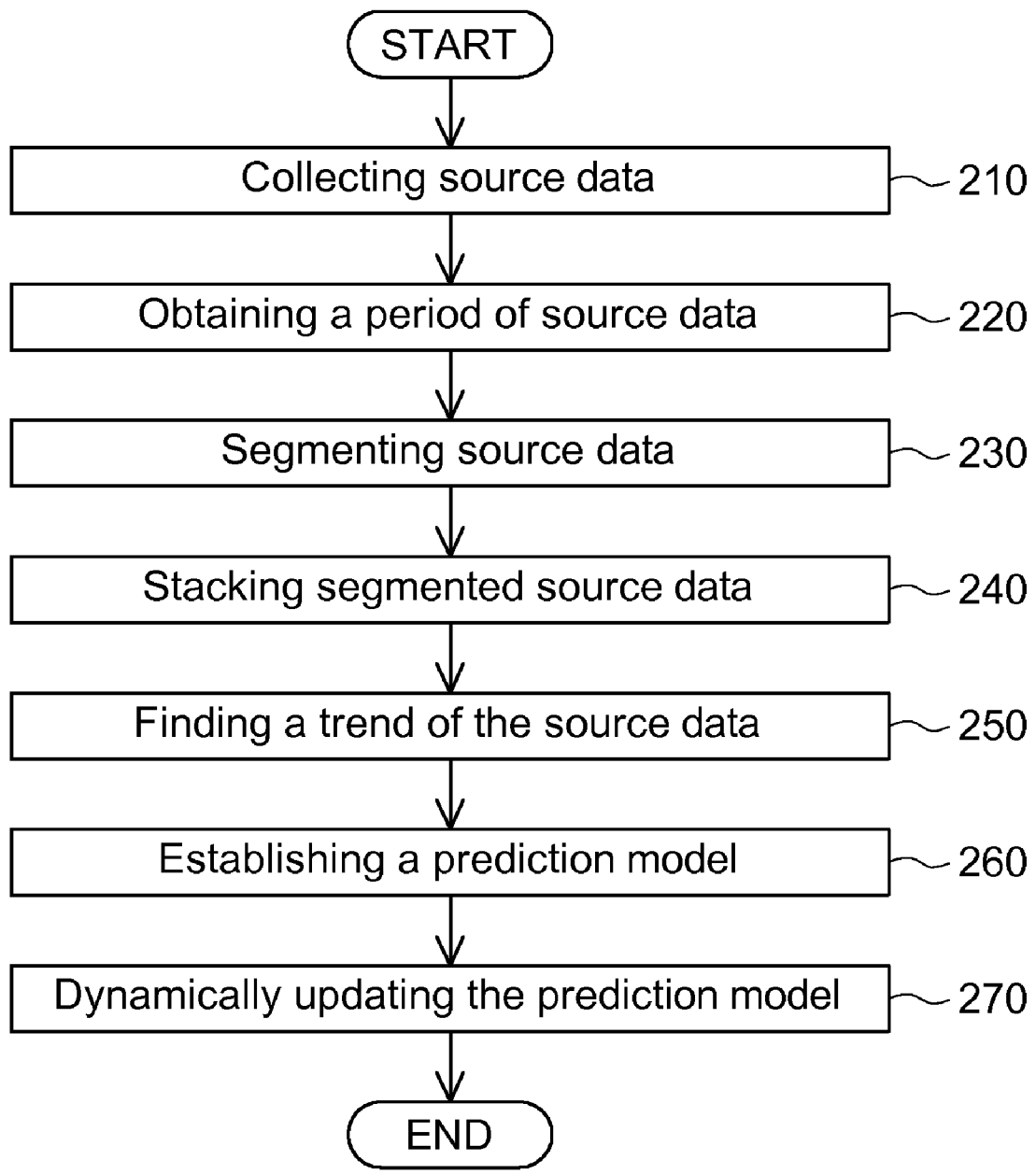
FIG. 2 is a flow chart showing the operation of a prediction module 122 according to the embodiment of the invention.

FIG. 2 is a flow chart showing the operation of the prediction module 122 according to the embodiment of the invention. As shown in FIG. 2, the data collection module 110 collects data according to the command transmitted from the data processing module 120, and returns the collected data to the data processing module 120, as shown in step 210.

Next, the period (i.e. the cycle) of the source data (i.e. the collected data) is obtained, as shown in step 220. If the period of the collected data may be obtained in advance, it may be inputted to the prediction module 122 in advance, and a length of the collected data is equal to at least twice of the period. If the period of the collected data cannot be obtained in advance, the prediction module 122 predicts the period of the source data after the data collection module 110 collects enough data. The predicted period of the source data will be mentioned in the following. The length of the source data T is assumed to be equal to n. The source data T is shifted by i into another data T', wherein i ranges from 1 to n/2 (the maximum period is about one half of data length). The similarity between T and T' is determined by way of comparison according to the similarity (SIM) function, and the less calculated value of the SIM function represents the higher similarity. If the period of the source data T is P, then the similarity between the source data T and the data T' shifted by P is the highest (the value of the SIM function is the lowest). Because T' has n/2 versions, n/2 values of the SIM function may be obtained. The shift value corresponding to the second smallest among the n/2 values of the SIM function is served as a predicted value of the period p. The shift value corresponding to the smallest among the n/2 values of the SIM function may be the initial point (i=0), so it is eliminated. In addition, if the found period p is not satisfied, more data may be further collected to predict the period.

Figure 3A:
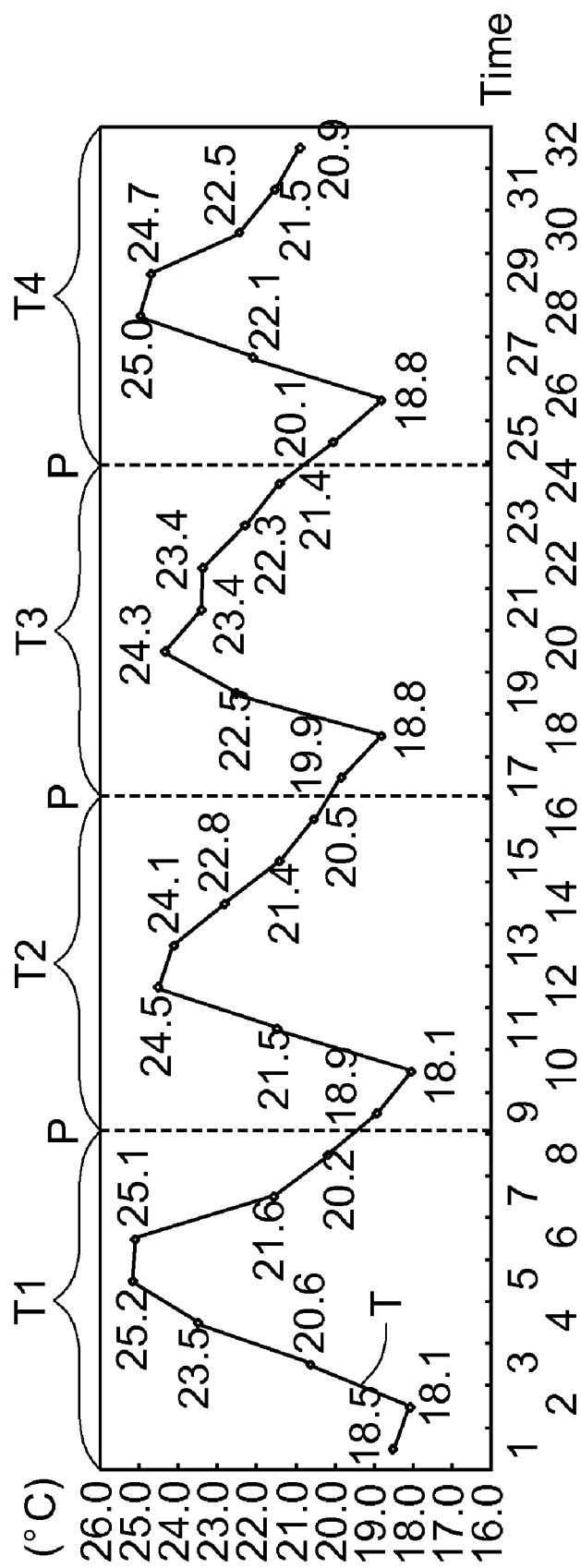
FIG. 3A shows an example of segmenting source data T having a period P.

After the period of the source data is obtained, it is possible to segment the source data according to the period, as shown in step 230. FIG. 3A shows an example of segmenting the source data T having the period P. As shown in FIG. 3A, the source data T is segmented into four segment data T1 to T4 according to the period P, wherein the source data represents the temperature, the vertical axis represents the temperature, and the horizontal axis represents the sense time point.

Figure 3B:
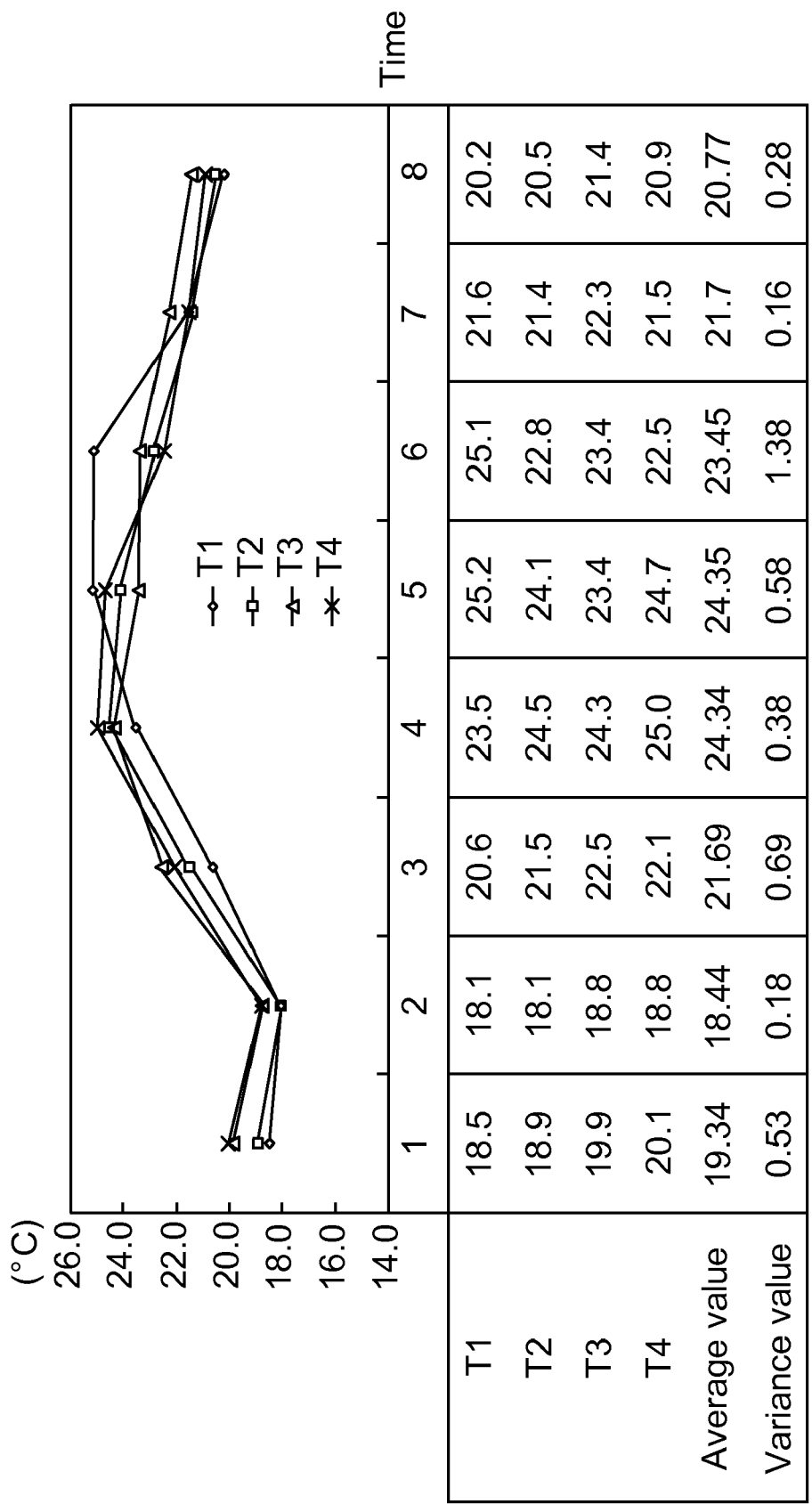
FIG. 3B shows a result after the segments of data T1 to T4 of FIG. 3A are stacked.

Next, the segment data are stacked, as shown in step 240. FIG. 3B shows a result after the segment data T1 to T4 of FIG. 3A are stacked, wherein the vertical axis represents the temperature, and the horizontal axis represents the time point.

Next, it is to find the trend of the source data, as shown in step 250. In finding the trend of the source data, the statistical value of each segment data at each time point may be calculated. In this embodiment, the average and the variance value are illustrated as an example. In FIG. 3B, for example, the average value (19.34) and the variance value (0.53) of the segment data T1 to T4 at the time point 1 are calculated. If the variance value is less than a threshold value, the average value satisfies the confidence level and the error tolerance allowed by the user. That is, the data processing module 120 may return the average value to the user. Oppositely, if the variance value is greater than the threshold value, the average value does not satisfy the confidence level and the error tolerance allowed by the user. Thus, the data processing module 120 informs the data collection module 110 to collect data and return the collected data to the user. The setting of the threshold value is determined according to the user parameter and the data property, wherein the user parameter are example a confidence level, an error tolerance, a sense probability (or a non-parametric model) and the like. When the error tolerance gets larger, the power-saving becomes higher. When the confidence level gets higher, the power-saving and the error rate become lower. When the detection probability gets higher, the power-saving and the error rate become lower. The higher detection probability represents the more detection times, the lower opportunity of power-saving, and the lower opportunity of the returned data having error.

Next, the prediction model is established, as shown in step 260. In the prediction model, the prediction point, the sense point, the check point and the sense probability (or a non-parametric model) are designated. If the variance value at this time point is less than the threshold value, the time point is set as the prediction point. If the time point is set as the prediction point, no data sensing is performed at this time point, and the average value is returned to the user. On the contrary, if the variance value at this time point is greater than the threshold value, the time point is set as the sense point. If the time point is set as the sense point, data sensing is performed at this time point.

Figure 3C:
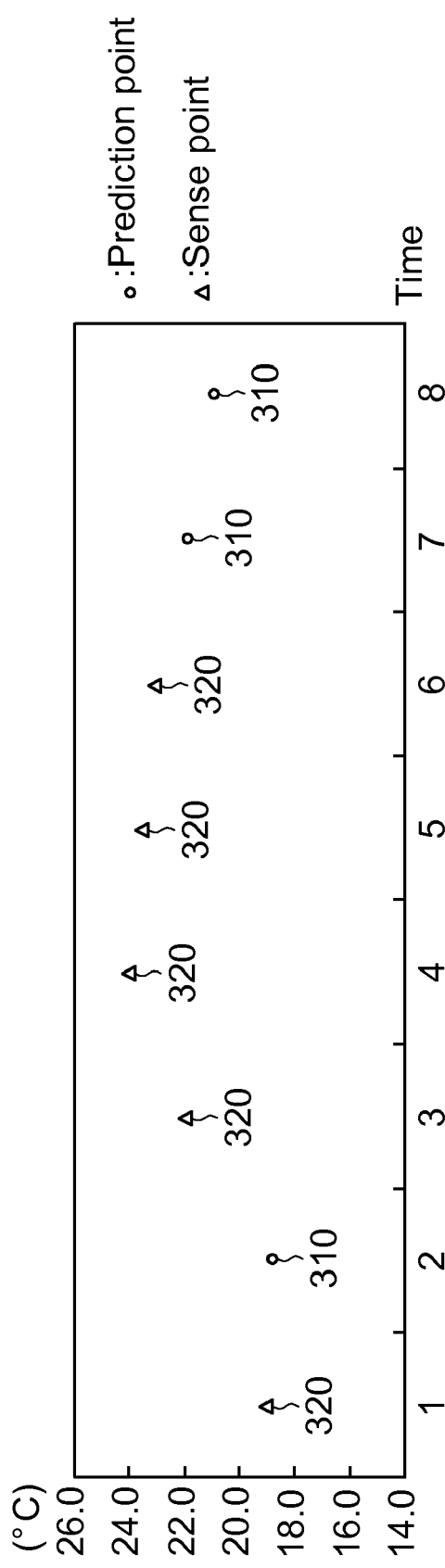
FIG. 3C shows an example of prediction points and sense points.

FIG. 3C shows an example of prediction points and sense points. Referring to FIGS. 3B and 3C, the variance values at the time points 2, 7 and 8 are less than the threshold point, so the time points 2, 7 and 8 are set as the prediction points 310, as shown in FIG. 3C. Similarly, the variance values at the time points 1, 3 to 6 are greater that the threshold point, so the time points 1, 3 to 6 are set as the sense points 320, as shown in FIG. 3C.

However, in order to check whether the trend of the source data is changed or not and to detect abnormal data, the sense probability (or a non-parametric model) at each prediction point is designated in the prediction model so that the prediction point may become the check point according to its sense probability (or a non-parametric model). By introduction of the check point, it is possible to check whether the trend of the source data is changed, to prevent return of error estimated data (i.e. the returned average value may be error or not good enough). For example, when the sense probability is 50%, it represents that the prediction point becomes the check point by 50%. When the prediction point becomes the check point, the data collection module 110 actually collects the source data at this time point (at the check point). In this embodiment, when the trend of the source data is changed at a certain time point, error occurs if the estimated value (i.e., the average value of the previous data) is returned to the user. In order to keep the high correctness of the returned data, it is possible to know occurrence of abnormal data or the changes in the trend of the source data through the check point.

Figure 3D:
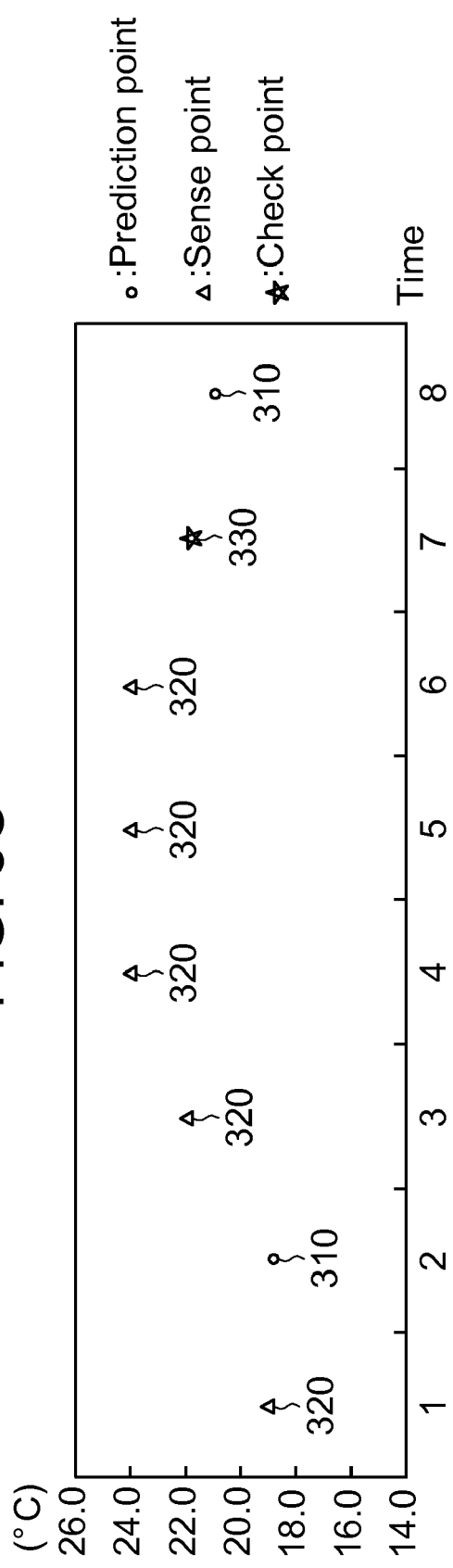
FIG. 3D shows an example of prediction points, sense points and check points.

FIG. 3D shows an example of prediction points, sense points and check points.

Illustration will be made with reference FIGS. 3C and 3D. It is assumed that the prediction point at the time point 7 becomes the check point 330 according to the sense probability (or a non-parametric model). So, as shown in FIG. 3D, the data processing module 120 returns the average value to user at the time points 2 and 8 (which are prediction points). At the time points 1 and 3 to 7, which are sense points or check points, the data collection module 110 collects data and returns the collected data to the data processing module 120 according to the command from the data processing module 120, and the data processing module 120 returns actual data to the user. Consequently, the data collection module 110 neither collects nor transmits data at some time points, which are prediction points, so the power consumption of the wireless sensor 112 may be saved.

Next, the prediction model is dynamically updated, as shown in step 270. Because the data collection module 110 returns actual data at the sense point and the check point, it is possible to dynamically update the prediction model according to the received actual data in this embodiment so that the prediction model may reflect the current trend of data. Consequently, it is possible to determine whether the prediction point is changed as the sense point, or whether the sense point is changed as the prediction point according to actual data. This is the so-called update of the prediction model.

There are two methods in dynamic updating the prediction model. In the first method, the prediction module 122 calculates the new average value and the new variance value according to the old average value, the old variance value, the data number and the new collected data, and thus determines whether the prediction model is updated or not. In the second method, the prediction module 122 calculates the new average value and the new variance value according to the newest pieces of data, and thus determines whether the prediction model is updated or not.

Figure 4:
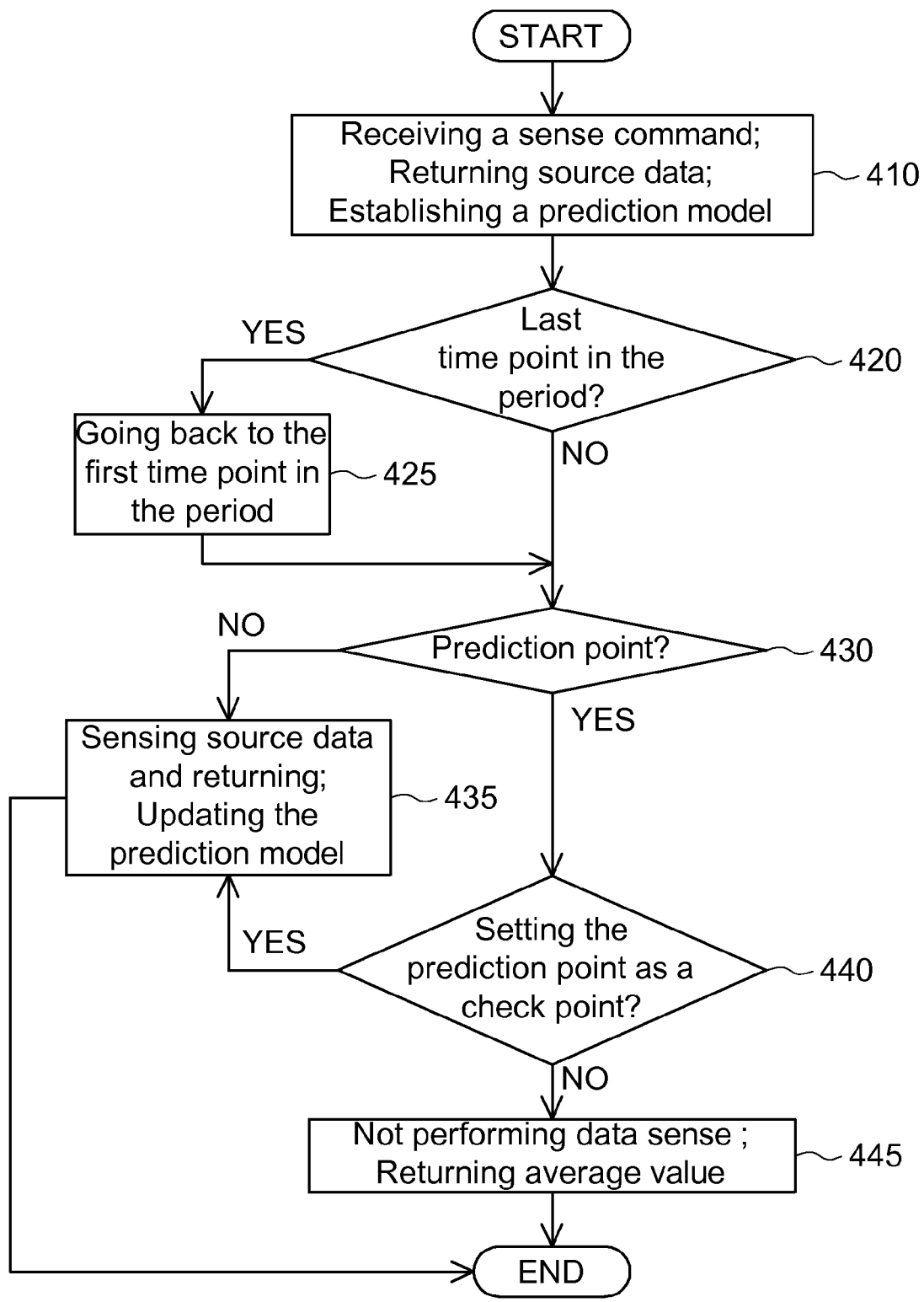
FIG. 4 shows the operation flows of a data collection module 110 and a data processing module 120.

Next, the operations of the data collection module 110 and the data processing module 120 will be described. FIG. 4 shows the operation flows of the data collection module 110 and the data processing module 120. At beginning, the data collection module 110 receives the sense command (e.g., the command to make the wireless sensor 112 sense data every five minutes) transmitted from the data processing module 120; the wireless sensor 112 in the data collection module 110 senses and returns data; and the data processing module 120 establishes the prediction model, as shown in step 410.

More particularly, in establishing the prediction model, the data processing module 120 can predict the period of data (the details are mentioned hereinabove) according to the received data, and calculate a predictable degree (PD) of the prediction model. If the predictable degree of this prediction model is unacceptable, the data processing module 120 continues receiving the collected data transmitted from the data collection module 110 to establish a better prediction model. In addition and as mentioned hereinabove, the prediction model may further be established according to the user parameter. More particularly, the user parameters may be different at different time points. When the data processing module 120 establishes a sufficiently good prediction model, the data processing module 120 again obtains a new sense command, which includes the position of the prediction point, the position of the sense point, the sense probability (or a non-parametric model), and the like, according to the user parameter and the prediction model, and thus transmits the new sense command to the data collection module 110.

Next, the execution module judges whether the current time point is a last time point in the period or not, as shown in step 420. If yes, the procedure goes to step 425; or otherwise the procedure goes to step 430.

In the step 425, the execution module sets the time point back to the first time point in the period. Alternatively, the execution module judges whether the current time point is the prediction point or not according to the received sense command, as shown in step 430. If yes, the procedure goes to step 440; or otherwise the procedure goes to step 435.

If the current time point is not the prediction point, it represents that the current time point is the sense point. So, as shown in step 435, the execution module 113 informs the wireless sensor 112 to perform data sensing and collecting, and returns the collected data to the data processing module 120. In addition, the data processing module 120 dynamically updates the prediction module (if needed) according to the received actually sensed data. Also, the data processing module 120 returns the actually sensed data to the user.

More particularly, if needed, the data processing module 120 updates the sense command according to the updated prediction module, and transmits new sense command to the data collection module 110 to control its data collection.

If the current time point is the prediction point, the execution module judges whether the prediction point is set as the check point or not according to the sense probability (or a non-parametric model), as shown in step 440. If yes, the procedure goes to the step 435; or otherwise the procedure goes to the step 445.

Because the current time point is the prediction point but not the check point, the wireless sensor 112 does not sense data. The data processing module 120 returns the average value of old data (i.e. the previously sensed data) to the user, as shown in step 445.

As shown in FIG. 4, if the current time point is the prediction point but not the check point in the embodiment of the invention, then the wireless sensor 112 senses data. So, it is possible to reduce the times of data transmission and data sensing and also the power consumption of the wireless sensor 112. In addition, if data periodicity becomes more obvious, the prediction points get more, and the power consumption may be saved more effectively. In addition, the introduction of the check point may update the prediction model in this embodiment so that the prediction model may be adapted to the varying environment (i.e. the data trend is in variation). When the prediction model is updated, it becomes more and more precise.

Figure 5A:
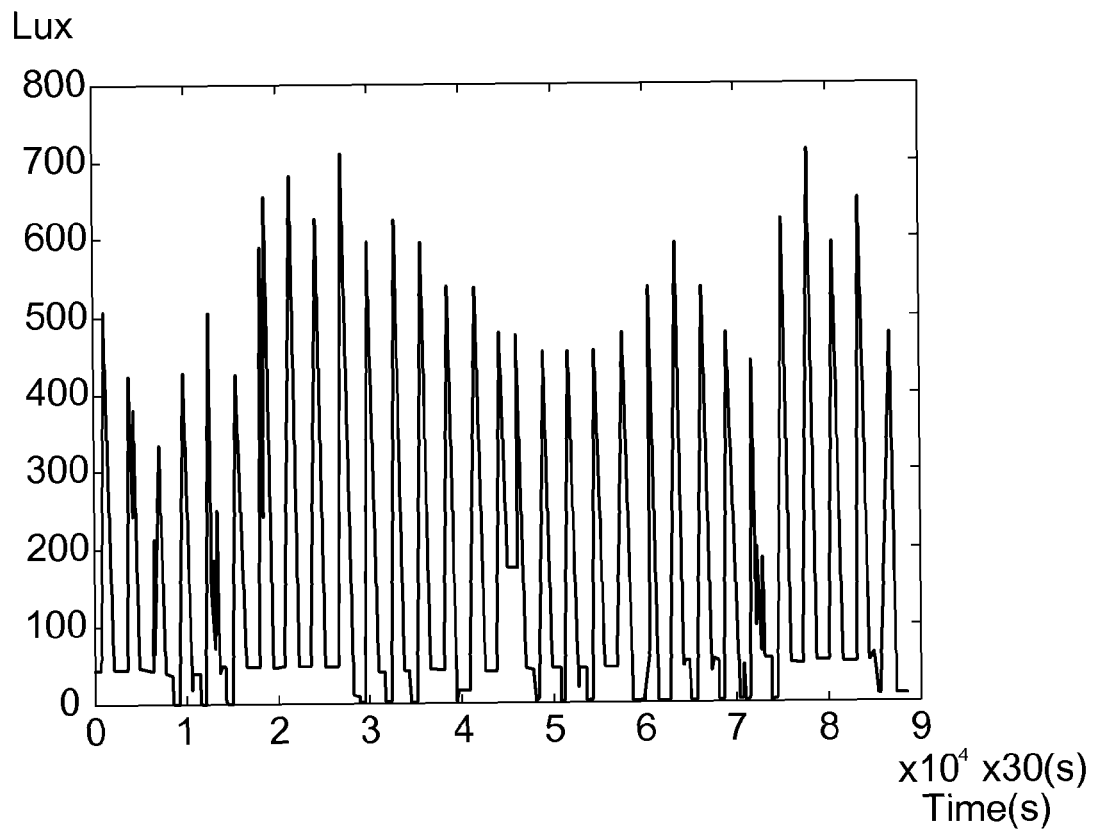
Figure 5B:
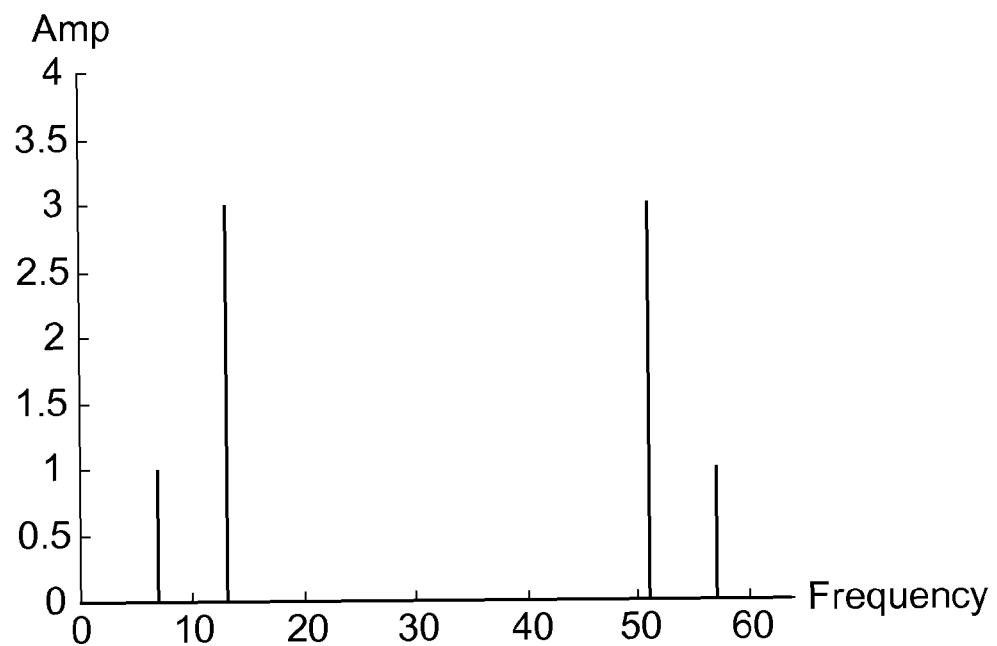
FIG. 5B shows data in frequency domain.

In the embodiment of the invention, there are other ways to know the period of source data. For example, after the data collection module collects data for an interval of time, the prediction module transforms data in time domain (shown in FIG. 5A) into data in frequency domain (shown in FIG. 5B) by way of Fourier transformation. Thereafter, the low frequency component of data in frequency domain is filtered out, and a period of data may be obtained by taking an inverse of the high-frequency value of data in frequency domain.

In the embodiment of the invention, the data collection may be performed using a sliding window. That is, the latest k pieces of data values are kept to calculate the estimated value, wherein k is a positive integer and represents data freshness. The estimated value is not limited to the average value, but may also be the statistical value, such as a median, a mode or the average value obtained after outliers are removed.

The check point is determined according to the probability in the embodiment of the invention, but may also be determined by other methods, such as a non-parametric model. In the non-parametric model, when new data is added to the prediction model, the difference between other data and new data at the corresponding time points is checked. When the number of other data having a difference less than a predetermined range is too small, the new data is judged as a by-point. If there are too many by-points at a certain time point, the time point may be set as the check point.

The data collection module 110 and the data processing module 120 have the unsymmetrical architecture in the embodiment of the invention. That is, the computing ability of the data collection module 110 is lower, and the computing ability of the data processing module 120 is stronger. Thus, complicated prediction operations (e.g., the trend calculation operation, dynamic adjustment of the prediction model and the like) are performed by the data processing module 120. In addition, the sense interval (data is sensed at some time points, and data is not sensed at other time points) may be automatically determined according to data property or the user parameter, based on probability theory. In addition, the prediction model may further be adaptively dynamically changed. Thus, the durability of the battery of the wireless sensor may be lengthened.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless sensor network, comprising:
   a data processing module, outputting a sense command; and
   a data collection module, receiving the sense command outputted from the data processing module, and collecting a source data and returning to the data processing module, wherein:
   the data processing module finds a trend of the source data to establish a prediction model;
   the data processing module updates the sense command and sends the updated sense command to the data collection module based on the established prediction model;
   the data collection module determines whether data collection is performed or not at a sense time point according to the sense command;
   the data collection module collects the source data and returns to the data processing module if data collection is performed;
   the data processing module obtains a predicted data according to the previous source data if data collection is not performed; and
   the data processing module shifts the source data to obtain a shifted data, the data processing module compares a similarity between the source data and the shifted data to obtain a period of the source data; or the data processing module transforms the source data from a time domain into a frequency domain, filters out a low frequency component of the transformed source data, and takes an inverse of a high-frequency value of the transformed source data to obtain the period of the source data.

2. The wireless sensor network according to claim 1, wherein the data processing module comprises:
   a first data transceiver module, transceiving the source data and the sense command between the data collection module and the data processing module;
   a database, coupled to the first data transceiver module, storing the source data received by the first data transceiver module;
   a first processing unit, coupled to the database, analyzing the source data; and
   a prediction module, coupled to the first processing unit, finding the trend of the source data to establish and dynamically update the prediction model.

3. The wireless sensor network according to claim 2, wherein the data collection module comprises:
   a second data transceiver module, transceiving the source data and the sense command between the data collection module and the data processing module;
   a wireless sensor, coupled to the second data transceiver module, sensing the source data according to the sense command received by the second data transceiver module;
   a second processing unit, controlling the wireless sensor to return the source data to the data processing module through the second data transceiver module; and
   an execution module, receiving the sense command received by the second data transceiver module to determine whether the wireless sensor performs data collection or not at the sense time point.

4. The wireless sensor network according to claim 3, wherein,
   if the period of the source data is known, the period of the source data is inputted to the prediction module; and
   if the period of the source data is unknown, the prediction module predicts the period of the source data according to the source data received by the data collection module.

5. The wireless sensor network according to claim 1, wherein:
   the data processing module segments the source data into a plurality of segmented data according to the period of the source data, and stacks the segmented data of the source data, and the data processing module calculates statistical value of the segmented data at the sense time point to find the trend of the source data.

6. The wireless sensor network according to claim 5, wherein:
   the statistical value comprises an average value and a variance value;
   if the variance value is greater than a threshold value, the data collection module collects the source data and returns the source data to the data processing module; and
   if the variance value is less than the threshold value, the data processing module returns the average value as the predicted data to the user.

7. The wireless sensor network according to claim 6, wherein:
   in the prediction model, the data processing module defines a prediction point, a sense point, a check point and a sense probability;
   if the variance value at the sense time point is greater than the threshold value, the sense time point is set as the sense point, and the wireless sensor performs data collection at the sense point; if the variance value at the sense time point is less than the threshold value, the sense time point is set as the prediction point, and the wireless sensor does not perform data collection at the sense point; and the data collection module sets the prediction point as the check point according to the sense probability, and the wireless sensor performs data collection at the check point.

8. The wireless sensor network according to claim 7, wherein the data processing module dynamically updates the prediction model according to the source data returned by the data collection module.

9. The wireless sensor network according to claim 8, wherein when the prediction model is dynamically updated, the data processing module calculates a new average value and a new variance value according to the past average value from the previous source data, the variance value, a quantity of the source data and a new source data and thus determines whether to update the prediction model or not.

10. The wireless sensor network according to claim 8, wherein when the prediction model is dynamically updated, the data processing module calculates a new average value and a new variance value according to a new source data and thus determines whether to update the prediction model or not.

11. A data sensing method of a wireless sensor network having a first data processing unit and a second data processing unit, the method comprising:

outputting a sense command, under control of the first data processing unit;

sensing a source data according to the sense command, under control of the second data processing unit;

finding a trend of the source data to establish a prediction model, under control of the first data processing unit;

updating the sense command based on the established prediction model, under control of the first data processing unit;

determining whether data sensing is performed at a sense time point or not according to the updated sense command;

sensing the source data and returning to the prediction model if data sensing is performed, under control of the second data processing unit; and obtaining a predicted data according to the prediction model, under control of the first data processing unit, if data sensing is not performed;

segmenting the source data into a plurality of segmented data according to a period of the source data;

combining the segmented data of the source data; and calculating statistical value of the segmented data at the sense time point to find the trend of the source data.

12. The method according to claim 11, further comprising:
storing the sensed source data;
analyzing the source data, under control of the first data processing unit; and
dynamically updating the prediction model after the trend of the source data is found.

13. The method according to claim 12, further comprising:
inputting the period of the source data if the period of the source data is known; and
finding the period of the source data according to the sensed source data if the period of the source data is unknown.

14. The method according to claim 11, wherein:
the statistical value comprises an average value and a variance value;
if the variance value is greater than a threshold value, the source data is sensed and returned to the user at the sense time point; and if the variance value is less than the threshold value, the average value of the source data is returned to the user at the sense time point.

15. The method according to claim 14, further comprising:
defining a prediction point, a sense point, a check point and a sense probability in the prediction model;
setting the sense time point as the sense point if the variance value at the sense time point is greater than the threshold value, wherein data sensing is performed at the sense point; and
setting the prediction point as the check point according to the sense probability, wherein the data sensing is performed at the check point.

16. The method according to claim 15, wherein dynamically updating the prediction model comprises:
calculating a new average value and a new variance value according to the average value of the previous source data, the variance value, a quantity of the source data and a new source data, and thus determining whether to update the prediction model or not.

17. The method according to claim 15, wherein dynamically updating the prediction model comprises:
calculating a new average value and a new variance value according to a new source data, and thus determining whether to update the prediction model or not.

18. A data sensing method of a wireless sensor network having a first data processing unit and a second data processing unit, the method comprising:

outputting a sense command, under control of the first data processing unit;

sensing an source data according to the sense command, under control of the second data processing unit;

finding a trend of the source data to establish a prediction model, under control of the first data processing unit;

updating the sense command based on the established prediction model, under control of the first data processing unit;

determining whether data sensing is performed at a sense time point or not according to the updated sense command;

sensing the source data and returning to the prediction model if data sensing is performed, under control of the second data processing unit;

obtaining a predicted data according to the prediction model, under control of the first data processing unit, if data sensing is not performed; and finding a period of the source data, comprising:
shifting the source data to obtain a shifted data and comparing a similarity between the source data and the shifted data to obtain the period of the source data; or
transforming the source data from a time domain to a frequency domain, filtering out a low frequency component of the transformed source data, and taking an inverse of a high-frequency value of the transformed source data to obtain the period of the source data.

19. The method according to claim 18, further comprising:
storing the sensed source data;
analyzing the source data, under control of the first data processing unit; and
dynamically updating the prediction model after the trend of the source data is found.

20. The method according to claim 19, further comprising:
inputting the period of the source data if the period of the source data is known; and
finding the period of the source data according to the sensed source data if the period of the source data is unknown.

* * * * *